United States Patent [19]

Hagin et al.

[11] 4,342,370

[45] Aug. 3, 1982

[54] ARTICULATED OMNIBUS

[75] Inventors: Faust Hagin; Hans-Jürgen Drewitz, both of Munich, Fed. Rep. of Germany

[73] Assignee: M.A.N. Maschinenfabrik Augsburg-Nuernberg AG, Munich, Fed. Rep. of Germany

[21] Appl. No.: 25,524

[22] Filed: Mar. 30, 1979

[30] Foreign Application Priority Data

Apr. 1, 1978 [DE] Fed. Rep. of Germany ....... 2814112

[51] Int. Cl.³ .......................................... B62D 31/002
[52] U.S. Cl. ..................................... 180/22; 280/424; 296/178
[58] Field of Search ........................ 180/22; 296/178

[56] References Cited

U.S. PATENT DOCUMENTS

| | | | |
|---|---|---|---|
| 2,163,748 | 6/1939 | Dayes | 296/178 |
| 2,563,917 | 8/1951 | Caesar | 296/178 |

FOREIGN PATENT DOCUMENTS

| | | | |
|---|---|---|---|
| 2716956 | 9/1978 | Fed. Rep. of Germany | 180/22 |
| 2420203 | 7/1979 | Fed. Rep. of Germany | |
| 1109985 | 2/1956 | France | 296/178 |
| 510640 | 1/1955 | Italy | 296/178 |
| 354673 | 7/1961 | Sweden | 180/22 |

*Primary Examiner*—Joseph F. Peters, Jr.
*Assistant Examiner*—M. J. Hill
*Attorney, Agent, or Firm*—Schwartz, Jeffery, Schwaab, Mack, Blumenthal & Koch

[57] ABSTRACT

An articulated omnibus having a two-axle leading member, a single-axle trailing member, and an engine aft of the trailing member axle. The forward wheelbase between the front and center axles is approximately equal to the rear wheelbase between the center and rear axles. The front overhang is about 1/6 to 1/7 of the forward wheelbase, and the rear overhang is about ½ to ⅓ of the forward wheelbase. Passenger entrances near the front and center axles have thresholds lower than the central portion of the forward member. A driver's seat and compartment are located above the front axle.

3 Claims, 1 Drawing Figure

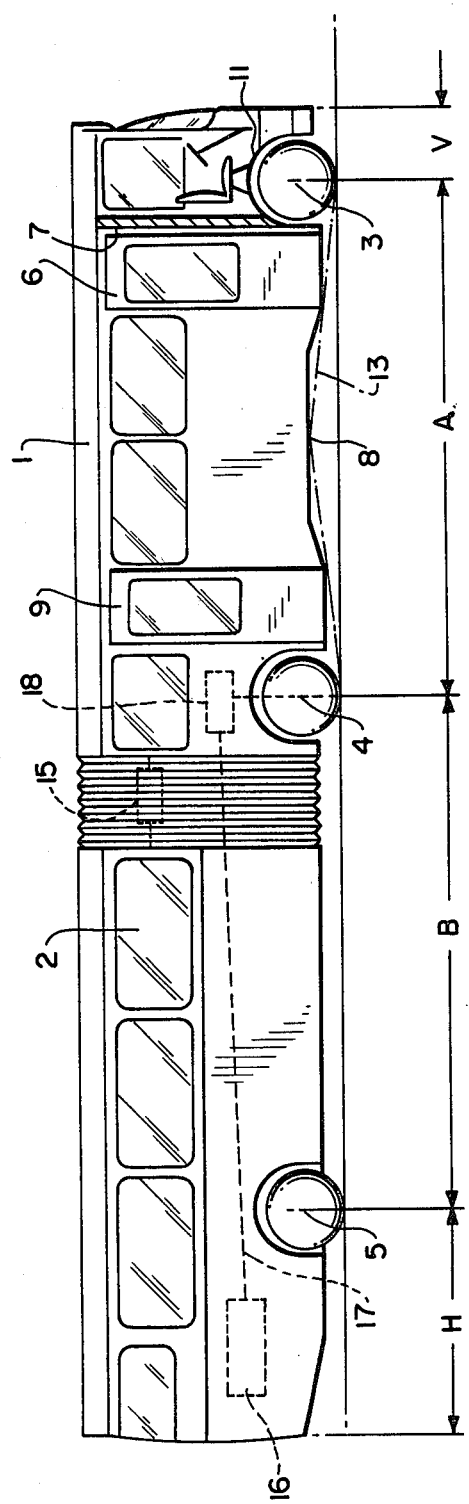

ARTICULATED OMNIBUS

BACKGROUND OF THE INVENTION

1. Field of the Invention

This invention relates to an articulated omnibus having a two-axle leading member and a single-axle trailing member connected to the leading member by means of a saddle joint, and having an engine which, looking in the direction of travel, is arranged aft of the axle of the trailing member of the vehicle.

2. The Prior Art

German published application No. DE-OS 24 20 203 teaches an articulated bus in which the axle of the trailing member is driven by the engine. Such a driving arrangement provides the advantage of especially uncomplicated design and of a construction offering particular savings of space. Where the friction on the road is reduced, however, this arrangement may cause the omnibus to buckle. Accordingly, special locking provisions are required to prevent inadvertent buckling, such provisions in turn involving correspondingly high costs of manufacture.

It has also been proposed to drive the center axle of an omnibus having a two-axle leading member and a single-axle trailing member. That is, the rear axle of the leading member is driven by an engine via a universal-joint shaft bridging the saddle joint between leading and trailing members. While this drive arrangement constitutes an uncomplicated construction, it has been shown that with the omnibus empty the load on the live center axle is deficient for known wheel bases and overhangs, which makes for poor running stability on the road.

SUMMARY OF THE INVENTION

In a broad aspect, the present invention provides an omnibus having a two-axle leading member and a single-axle trailing member designed to offer particular economy in space and cost of the drive arrangement, while maximizing the running stability without the use of special additional provisions.

It is a particular object of the present invention to provide a bus of the type mentioned above in which the center axle is the driven axle and the ratio of distances between the wheel bases and the overhangs is:

$$V:A:B:H = \frac{1}{6 \text{ to } 7} :1:1: \frac{1}{2 \text{ to } 3},$$

where V is the front overhang of the leading member of the vehicle, A is the wheelbase of the leading member of the vehicle, B is the distance between the center axle and the rear axle, and H is the rear overhang of the trailing member of the vehicle.

This ratio of distances, if maintained, puts a relatively high load on the center axle and so makes for good running stability, despite the rearward position of the engine, when the center axle is the driven axle. Location of the front axle near the very front end of the vehicle improves the space conditions in the passenger compartment of such an omnibus and correspondingly increases the wheelbase of the leading member of the vehicle. This in turn enables comparatively low entrance thresholds to be provided for passengers without unduly reducing the road clearance of the bus. In a further advantageous aspect of the present invention, an entrance is arranged between the axles of the leading member of the vehicle immediately adjacent the front wheel housing and/or the rear wheel housing, and the lower edge of the vehicle is made lower in the area of entrance or entrances than in the central area between the axles.

In a still further advantageous aspect of the present invention, the driver's seat of an omnibus constructed in accordance with the invention is arranged on a wheel housing of the front axle and the passenger compartment is separated from the driver's compartment by means of a wall. This improves working conditions for the driver and reduces the cost of heating the passenger compartment, considering that the temperature of the passenger compartment can be maintained at a level below that of the driver's compartment.

BRIEF DESCRIPTION OF THE DRAWING

The drawing shows in side elevational view a preferred embodiment of the invention.

THE PREFERRED EMBODIMENT

The drawing illustrates an articulated omnibus according to the invention in a side elevational view. A leading member 1 of the vehicle, having a front axle 3 and a rear axle 4, is articulately connected by means of a saddle joint 15 to a trailing member 2 of the vehicle having an axle 5. The forward overhang of leading member 1 is indicated by the letter V, the wheelbase of leading member 1 by the letter A, the wheelbase between rear axle 4 of leading member 1 and axle 5 of trailing member 2 by the letter B, and the rear overhang of trailing member 2 by the letter H. Wheelbase B is approximately equal to wheelbase A. The rear overhang H amounts to approximately ½ to ⅓ the length of wheelbase A, while front overhang V is only 1/6 to 1/7 the length of wheelbase A. Thus, front axle 3 is arranged very near the front end of the bus.

A driver's seat 10 is arranged on a wheel housing 11 located above front axle 3. The driver's compartment in the leading member of vehicle 1 is separated from the passenger compartment by a wall 7.

Directly adjacent front wheel housing 11 is a first entrance 6, the lower edge 8 of the vehicle in the area of entrance 6 being lower than in the center between the axles 3 and 4. A further entrance 9 may be arranged additionally immediately adjacent a wheel housing 12 located above rear axle 4 of leading member 1 of the omnibus. The lower edge 8 of the vehicle is also somewhat lower in the area of entrance 9 than in the center of leading member 1. Considering that the lower edge 8 of the vehicle has been lowered only in the immediate vicinity of axles 3 and 4, the ground clearance of the bus is relatively liberal despite the low entrances, as can be seen from chain-dashed line 13.

An engine 16 is arranged aft of axle 5 and is suitably connected for driving axle 4 by, for example, a universal-joint drive shaft 17 and a gear box 18.

What is claimed is:

1. An articulated omnibus, comprising:
    a leading member having a forward end, a rear end, a lower edge, a first axle located such that said forward end overhangs a distance V beyond said first axle, and a second axle located at a distance A aft of said first axle;
    a trailing member having a forward end articulately connected to said leading member rear end, and having a rear end, a third axle located at a distance B aft of said second axle such that said trailing member rear end overhangs a distance H aft of said third axle, and an engine located aft of said third axle and operatively connected for driving said second axle, wherein the ratio of said distance is as follows:

V is less than about 1/6 A,

A:B is about 1:1, and

H is less than about ½ B;

a front wheel housing located in said leading member above said first axle, and a forward passenger entrance located immediately adjacent and to the rear of said front wheel housing, said lower edge being lower in the vicinity of said forward passenger entrance than in an area centrally-located between said first and second axles; and a driver's seat located above said front wheel housing.

2. The omnibus of claim 1, wherein said trailing member forward end is articulately connected to said leading member rear end by means of a saddle joint.

3. The omnibus of claim 1, further comprising a rear wheel housing located in said leading member above said second axle, and a rear passenger entrance located immediately adjacent said rear wheel housing, said lower edge being lower in the vicinity of said rear passenger entrance than in an area centrally-located between said first and second axles.

* * * * *